United States Patent
Kunc et al.

(10) Patent No.: US 8,427,386 B2
(45) Date of Patent: Apr. 23, 2013

(54) METHOD AND CIRCUIT FOR TRANSMITTING AND RECEIVING RADIO WAVES WITH A SINGLE OSCILLATORY CIRCUIT ANTENNA

(75) Inventors: Vinko Kunc, Ljubljana (SI); Andrej Vodopivec, Ljubljana (SI)

(73) Assignee: IDS Microchip AG, Wollerau (CH)

( * ) Notice: Subject to any disclaimer, the term of this patent is extended or adjusted under 35 U.S.C. 154(b) by 125 days.

(21) Appl. No.: 12/998,545

(22) PCT Filed: Oct. 30, 2009

(86) PCT No.: PCT/SI2009/000061
§ 371 (c)(1),
(2), (4) Date: Jun. 23, 2011

(87) PCT Pub. No.: WO2010/050906
PCT Pub. Date: May 6, 2010

(65) Prior Publication Data
US 2011/0254750 A1  Oct. 20, 2011

(30) Foreign Application Priority Data
Oct. 30, 2008  (SI) .................. P-200800264

(51) Int. Cl.
*H01Q 1/52*  (2006.01)
(52) U.S. Cl.
USPC ........... 343/852; 343/745; 343/850; 343/860; 375/343
(58) Field of Classification Search ............... 343/745, 343/850, 852, 860; 375/340, 343
See application file for complete search history.

(56) References Cited

U.S. PATENT DOCUMENTS

| | | | | | |
|---|---|---|---|---|---|
| 3,022,418 | A | * | 2/1962 | Smyth et al. | 375/312 |
| 5,266,963 | A | * | 11/1993 | Carter | 343/850 |
| 5,367,310 | A | * | 11/1994 | Warnagiris | 343/745 |
| 5,469,180 | A | * | 11/1995 | Wiggenhorn | 343/744 |
| 6,621,467 | B1 | * | 9/2003 | Marsh | 343/850 |
| 7,830,989 | B2 | * | 11/2010 | Mohamadi | 375/343 |
| 2007/0045418 | A1 | | 3/2007 | Charrat et al. | |

FOREIGN PATENT DOCUMENTS

| | | |
|---|---|---|
| EP | 1251458 A2 | 10/2002 |
| EP | 1848083 A2 | 10/2007 |
| GB | 2307379 A | 5/1997 |
| WO | WO/2006/030362 A1 | 3/2006 |
| WO | WO 2008/047264 A2 | 4/2008 |

* cited by examiner

*Primary Examiner* — Tho G Phan
(74) *Attorney, Agent, or Firm* — Jacobson Holman PLLC

(57) ABSTRACT

Output terminals (o1, o2) of a differentially excited transmitting circuit (TC) are connected through matching capacitors (MC1, MC2) to connecting terminals of the oscillatory circuit antenna (OCA) on the other side said connection terminals are directly connected to input terminals of a receiving circuit (RC). Each of the input terminals (i1, i2) of the receiving circuit (RC) is connected to an earthing terminal (m) of the integrated transceiver circuit (TRC) through a corresponding undervoltage-protection diode (UPD1, UPD2) determining a lower potential value of a received signal and a corresponding overvoltage-protection diode (OPD1, OPD2) determining an allowed upper potential value of the received signal exceeding said lower potential value by the highest possible voltage still allowable by the integrated transceiver circuit (TRC). The highest allowable voltage amplitude of the received signals supplied to the input of the receiving circuit (RC) practically equals the highest possible voltage, which is still allowed by the integrated receiver circuit, thus exceeds energization voltage.

8 Claims, 3 Drawing Sheets

Figure 1:
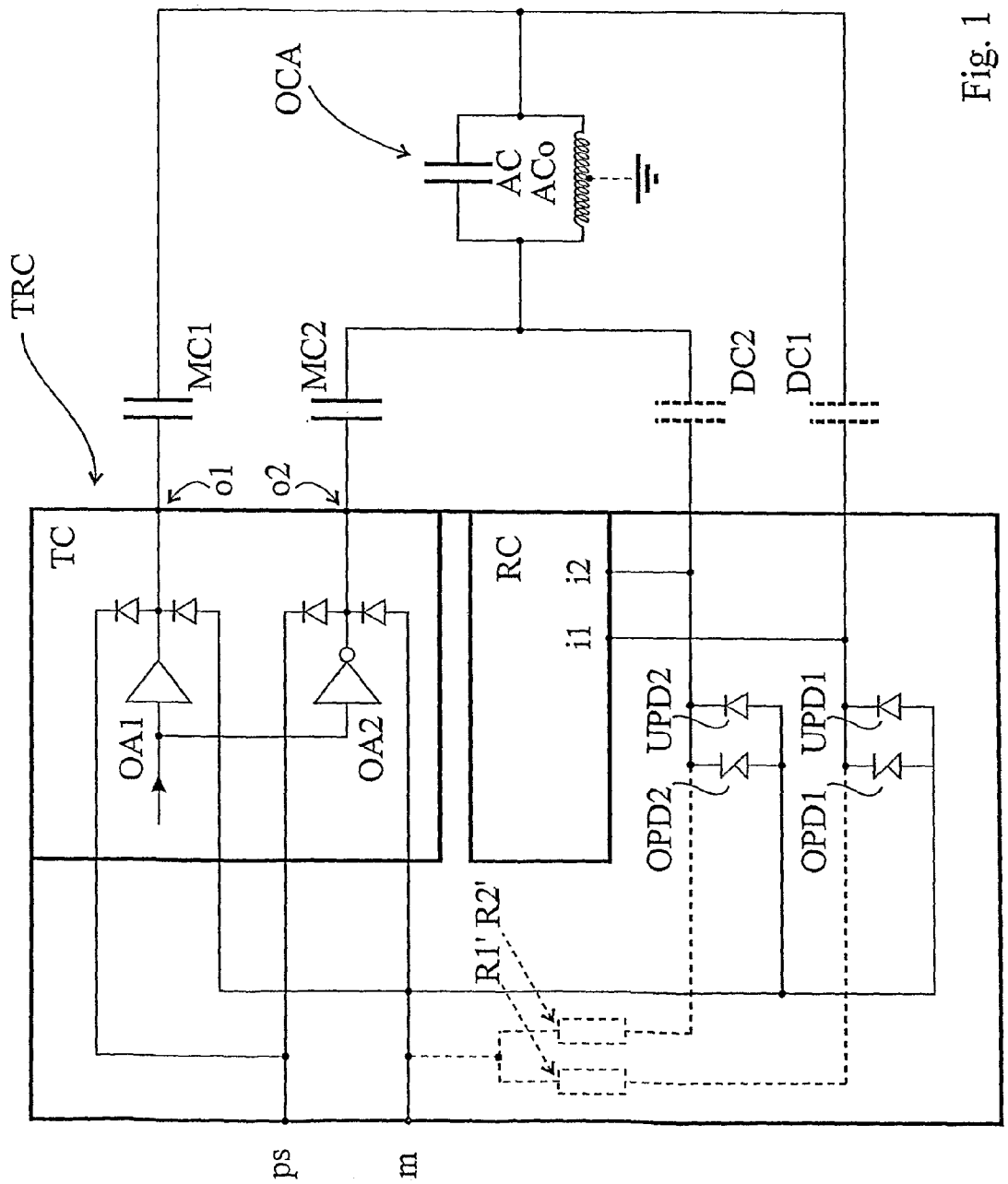

METHOD AND CIRCUIT FOR TRANSMITTING AND RECEIVING RADIO WAVES WITH A SINGLE OSCILLATORY CIRCUIT ANTENNA

This is a national stage of PCT/SI09/000,061 filed Oct. 30, 2009 and published in English, which claims the priority of Slovenia number P-200800264 filed Oct. 30, 2008, hereby incorporated by reference.

The invention belongs to the area of near-field communications and concerns a method and a circuit for transmitting and receiving radio waves with a single oscillatory circuit antenna wherein a low power transmitted signal is conducted from an output of a transmitting circuit through matching capacitors to connecting terminals of the oscillatory circuit antenna. Said method and circuit are improved in that, on the one hand, a non-attenuated received signal is conducted to an input of a receiving circuit included therein, and on the other hand, an interval of potential values of the received signal is determined, which interval should be most suitable for an integrated transceiver included in said circuit as well, in order to exploit power of the received signal for an additional energization in said receiving circuit.

An oscillatory circuit is frequently used as an antenna for radio waves having a frequency from several megahertz up to hundred megahertz.

There is a tendency to reduce dimensions of the antenna system in a portable transmitting and receiving set. This is accomplished in an effective way by arranging a transmitting antenna and a receiving antenna tuned to the same frequency so that a literal supperposition of their planar transmitting and receiving coil is realized on a common printed circuit board (PCT/SI2008/000028). The planar receiving coil is formed and arranged with respect to the planar transmitting coil in a way that magnetic flux generated by electric current in the planar transmitting coil and established through the planar receiving coil equals zero. Voltage induced in the planar receiving coil has to be lower than the energizing voltage of a receiving circuit.

Reduced dimensions of the antenna system can also be achieved by using the same antenna LC oscillatory circuit to both transmit and receive radio waves.

The common LC oscillatory circuit is connected through matching capacitors to a differentially excited transmitting circuit and through an attenuating element to a receiving circuit included in a transceiver circuit so that it operates as a transmitting and receiving antenna (WO 2008/047264). A received signal voltage amplitude across connecting terminals of the LC oscillatory circuit during transmitting even at a reduced transmitting power, e.g. below 200 mW, is still much higher than the highest voltage still allowed by the integrated transceiver circuit. The received signal would damage an input amplifier in the receiving circuit. The received signal from the connecting terminals of the antenna having a substantially reduced amplitude is therefore fed to the input of the receiving circuit through the attenuating element; the received signal from the connecting terminals of the antenna in the transceiver circuit disclosed by said patent application (FIG. 3) is first conducted through a capacitive voltage divider C1b/C1c and then through a resistance voltage divider R1/R2. Said attenuation of the received signal reduces the receiving sensitivity of the receiver as well as makes energization of the receiving circuit impossible.

In a transceiver circuit as described in the patent application US 2007/0045418 A1, a receiving circuit DEMCT (FIG. 6) is connected through an attenuating circuit to a single LC oscillatory circuit functioning as a transmitting and receiving antenna. The attenuating circuit is made as a band-pass filter and the signal received from an antenna terminal is attenuated so much that a signal amplitude at an input of a receiving circuit does not exceed the voltage range of energization. The subject of said patent application essentially refers to generation of a dc voltage by rectifying the received signal in order to energize the receiving circuit. Terminals of a coil being earthed at its own midpoint are connected to a series-connected rectifying diode (FIG. 5a, b, c). Only a double half-wave rectification is performed. Additionally, said rectifying diode cannot be produced in a standard CMOS technology and has to be produced as an external element.

Transmitting and receiving radio waves with a single oscillatory circuit antenna is disclosed in WO 2006/030362 A1, EP 1251 458 A2 and GB 2 307 379 A, however, a level of a receiver input signal is reduced to a supply voltage level. EP 1 848 083 A2 discloses an overvoltage detector using a Zener diode as a level translator element to control power supply in flat panel television.

The invention solves the technical problem how to improve a method and a circuit for transmitting and receiving radio waves with a single oscillatory circuit antenna in that the most suitable interval of potential values of a signal received by said oscillatory circuit antenna will be established at the input of a receiving circuit included in a transceiver of said circuit so that the amplitude of the received signal at the input of the receiving circuit will be as high as possible.

Said technical problem is solved by the method of the invention for transmitting and receiving radio waves with a single oscillatory circuit antenna having the features cited in the first claim and the variant of the method embodiment is characterized by the features of the dependent claim 2 and by a circuit of the invention for carrying out said method having the features cited in the third claim and the variant of the circuit embodiment are characterized by the features of dependent claims 4 to 8.

The advantage achieved by the invention mainly exists in that the highest allowable voltage amplitude of received signals supplied to the input of a receiving circuit actually equals the highest possible voltage, which is still allowed by an integrated receiver circuit, it thus exceeds energization voltage herewith providing for a higher power of the transmitted signal. No additional components with respect to a known transceiver circuit have been used here. By rectifying the received signal, the method and circuit as proposed by the invention also make it possible to achieve the highest dc voltage allowable in the integrated receiver circuit for at least additional energization of the receiving circuit.

The invention will now be explained in more detail by way of the description of embodiments of the method of the invention and of the circuit of the invention with reference to the accompanying drawing representing in FIG. 1 a basic embodiment of the circuit of the invention for transmitting and receiving radio waves with a single oscillatory circuit antenna, FIG. 2 a variant embodiment of the circuit of the invention for transmitting and receiving radio waves with a single oscillatory circuit antenna, FIG. 3 in window I and II, time development of a potential of a received signal at input terminals of a receiving circuit and, in window III and IV, time development of a potential at output terminals of a transmitting circuit, in both cases for the basic embodiment of the circuit of the invention, and FIG. 4 in window I and II, time development of a potential of a received signal at input terminals of a receiving circuit and, in window III, time development of a potential at an output of a rectifier, in both cases for the variant embodiment of the circuit of the invention.

Figure 2:
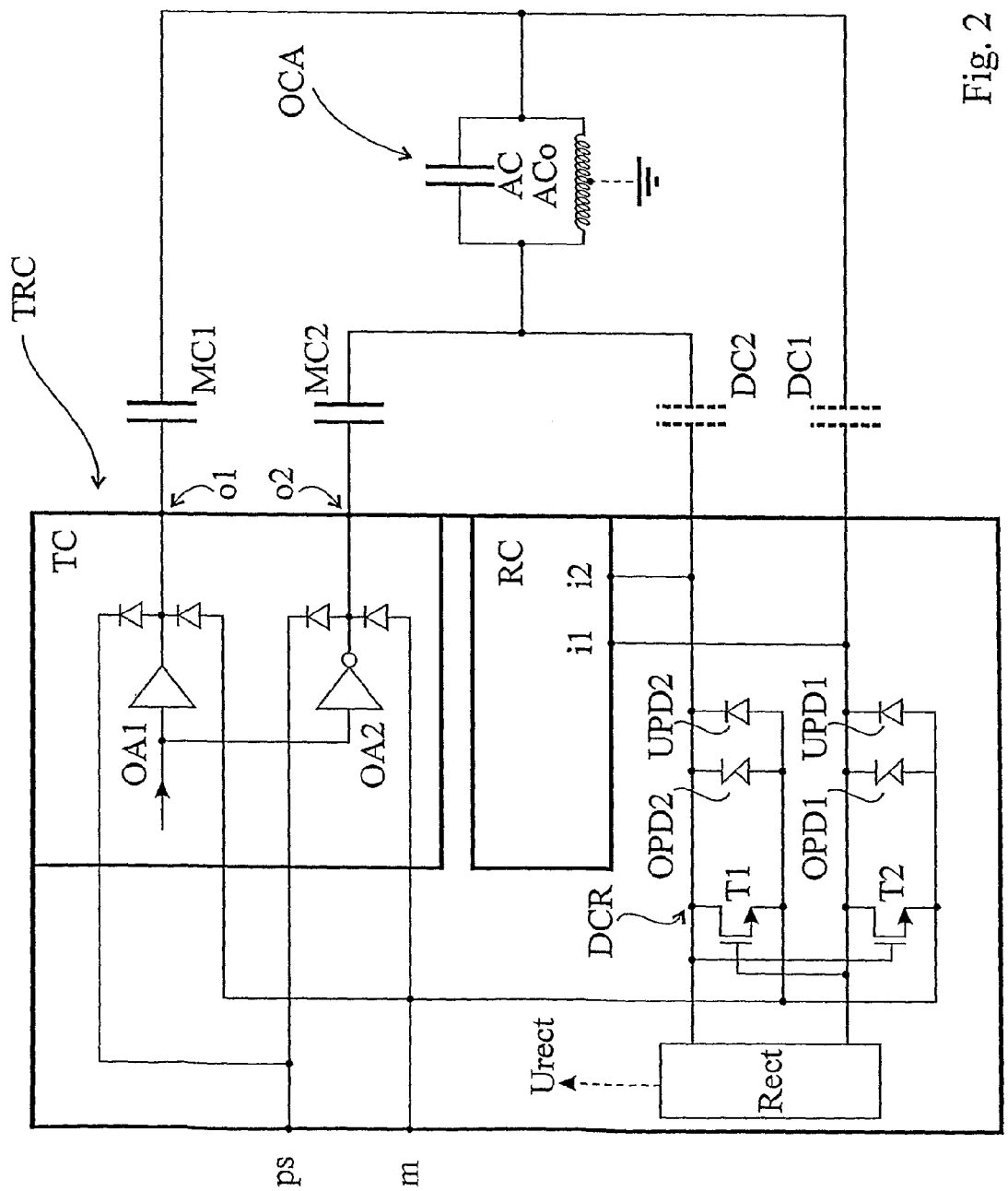

A basic embodiment of the circuit of the invention for transmitting and receiving radio waves with a single oscillatory circuit antenna OCA is represented in FIG. 1.

In a known way, a signal to be transmitted is amplified by two output amplifiers OA1 and OA2, which are overvoltage protected by a diode, in a transmitting circuit TC, which is included within a transceiver circuit TRC and includes a differentially-exciting circuit, and is conducted through output terminals o1 and o2 and matching capacitors MC1 and MC2, respectively, to connecting terminals of the oscillatory circuit antenna OCA.

The oscillatory circuit antenna OCA consists of an antenna capacitor AC and an antenna coil ACo, both connected between the connecting terminals of the oscillatory circuit antenna OCA.

On the one hand, the connecting terminals of the oscillatory circuit antenna OCA are directly, i.e. without any intermediate attenuating circuit, connected to input terminals i1 and i2 of a receiving circuit RC that is included within the transceiver circuit TRC.

On the other hand each one of the input terminals i1 and i2 of the receiving circuit RC of the invention is connected to an earthing terminal m of the integrated transceiver circuit TRC through a corresponding undervoltage-protection diode UPD1 and UPD2, respectively, said undervoltage-protection diodes determining the lower potential value of a received signal with regard to a potential of the earthing terminal m, and through a corresponding overvoltage-protection diode OPD1 and OPD2. Said overvoltage-protection diodes OPD1 and OPD2 determine an allowed upper potential value of the received signal so that said upper potential value exceeds said lower potential value by the highest possible voltage still allowable by the integrated transceiver circuit TRC. Said lower potential value lies approximately 0.6 V below the potential value of the earthing terminal.

The potential of the received signal at the input terminals of the receiving circuit RC is namely—strictly speaking—not determined by any external path and is therefore as described hereinbefore kept within a value interval between the lower potential value being approximately equal to the earth potential of the integrated transceiver circuit TRC and an upper potential value exceeding said lower potential value by the highest possible voltage still allowable by the integrated transceiver circuit TRC.

According to the invention, the upper potential value of the received signal is not bound to a potential of positive energizing in the transceiver circuit TRC (power supply terminal ps) and may therefore considerably exceed it in a favourable way as well.

The advantageous effects of the solution of the present invention could also be achieved by a weak coupling realized by high resistances R1', R2', represented by dots in FIG. 1, between the input terminals i1 and i2 of the receiving circuit RC and the earthing terminal in of the integrated transceiver circuit TRC. When the received signal is not at the lowest point said weak coupling shifts its potential, yet the shift is small and does not influence the quality of reception. When in the lowest point, an input overvoltage-protection circuit then leads off a charge accumulated in the mean time due to said weak coupling.

It should be mentioned that the oscillatory circuit antenna OCA, the matching capacitors MC1 and MC2 and decoupling capacitors DC1, DC2 between the connecting terminals of the oscillatory circuit antenna OCA and the input terminals i1, i2 of the receiving circuit RC are produced on a common printed circuit board. A variant embodiment of the circuit of the invention for transmitting and receiving radio waves with a single oscillatory circuit antenna OCA is represented in FIG. 2.

According to the invention, the input terminals i1 and i2 of the receiving circuit RC are on the one side connected to the earthing terminal m of the integrated transceiver circuit TRC also through a DC restorer integrated in said circuit. The DC restorer determines the lower potential value closer to the potential of the earthing terminal m than the undervoltage-protection diodes UPD1 and UPD2. The DC restorer alternatingly connects the input terminals i1 and i2 of the receiving circuit RC to the potential of the earthing terminal in, always namely the input i1 or i2 currently having a lower potential.

According to the invention, the input terminals i1 and i2 of the receiving circuit RC are on the other side connected to input terminals of a rectifier Rect integrated in the transceiver circuit TRC. The rectifier Rect is made up of two rectifying elements, both for positive direction, and a smoothing capacitor. The rectifier output voltage Urect is used for additional energization in the integrated circuit, especially of elements within the receiving circuit RC.

Whenever the midpoint of a coil ACo of said oscillatory circuit antenna OCA is earthed, the connecting terminals of the oscillatory circuit antenna OCA must be connected to the input terminals i1, i2 of the receiving circuit RC through dc decoupling capacitors DC1 and DC2.

The overvoltage-protection diodes OPD1 and OPD2 can be overvoltage protective transistors or any other passive or active circuits capable of limiting the upper potential value of the received signal.

The dc restorer DCR is provided with transistors T1 and T2, e.g. MNOS transistors, or with Schottky diodes (not represented). The Schottky diodes are connected between the input terminals i1 and i2 of the receiving circuit RC and the earthing terminal m of the integrated transceiver circuit TRC. The lower potential value of the received signal is fixed by transistors to approximately −100 mV and by the Schottky diodes to approximately −200 mV, in both cases with respect to the potential of the earthing terminal m.

The known method for transmitting and receiving radio waves with a single oscillatory circuit antenna OCA, which method exists in that a transmitted signal from the output of a transmitting circuit TC included in an integrated transceiver circuit TRC is conducted through a suitable matching capacitor MC1, MC2 to connecting terminals of the oscillatory circuit antenna OCA, is improved by the invention as follows:

a received signal is conducted from the connecting terminals of the oscillatory circuit antenna OCA directly to the input of a receiving circuit RC included in the integrated transceiver circuit TRC;

a potential of said received signal at the input of the receiving circuit RC is maintained within an interval between the set lower potential value and an upper potential value.

The lower potential value is here approximately equal to the earth potential of the integrated transceiver circuit TRC. It is actually 0.6 V below said earth potential when the undervoltage-protection diodes UPD1 and UPD2 are used. The upper potential value exceeds said lower potential value by the highest possible voltage still allowable by the integrated transceiver circuit TRC.

According to a variant embodiment of the method of the invention for transmitting and receiving radio waves with a single oscillatory circuit antenna OCA, said lower potential value of the received signal at the input of the receiving circuit RC is first a bit corrected so that it is actually maintained at the earth potential of the integrated transceiver circuit TRC. The received signal from the input of the receiving circuit RC is then rectified, too.

Said conversion of the received signal by capturing its potential between said lower and upper potential values allows for peak-to-peak rectification. The technical solution described in the patent application US 2007/0045418 A1 is provided only with a double half-wave rectification, which delivers a twice lower voltage. The electric direct current generated hereby is used as a supply source for the entire receiving circuit RC or a least as an additional supply source for a part of said circuit.

Figure 3:
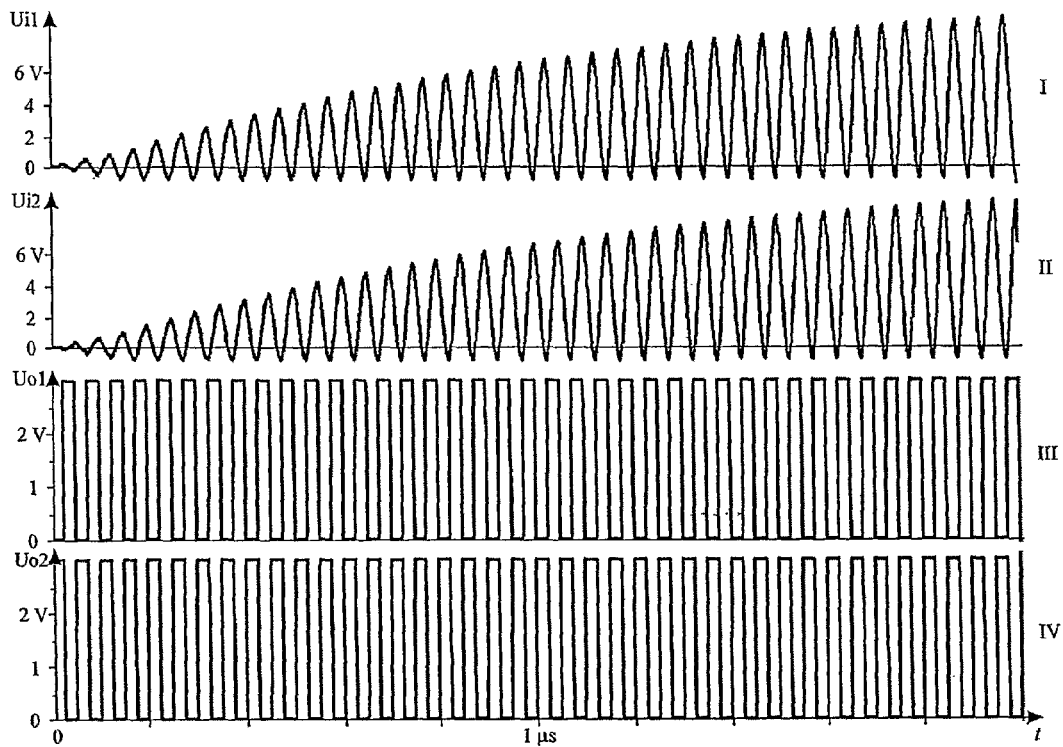

In the basic embodiment of the invention of the transceiver circuit TRC a potential of a received signal at the input terminals i1, i2 of the receiving circuit RC reaches the peak-to-peak voltage 8.5 V after an initial transient (FIG. 3 windows I and II). As a comparison, transmitted differential signals having amplitude not exceeding the supply voltage of 3 V, are represented in windows III and IV in FIG. 3.

Figure 4:
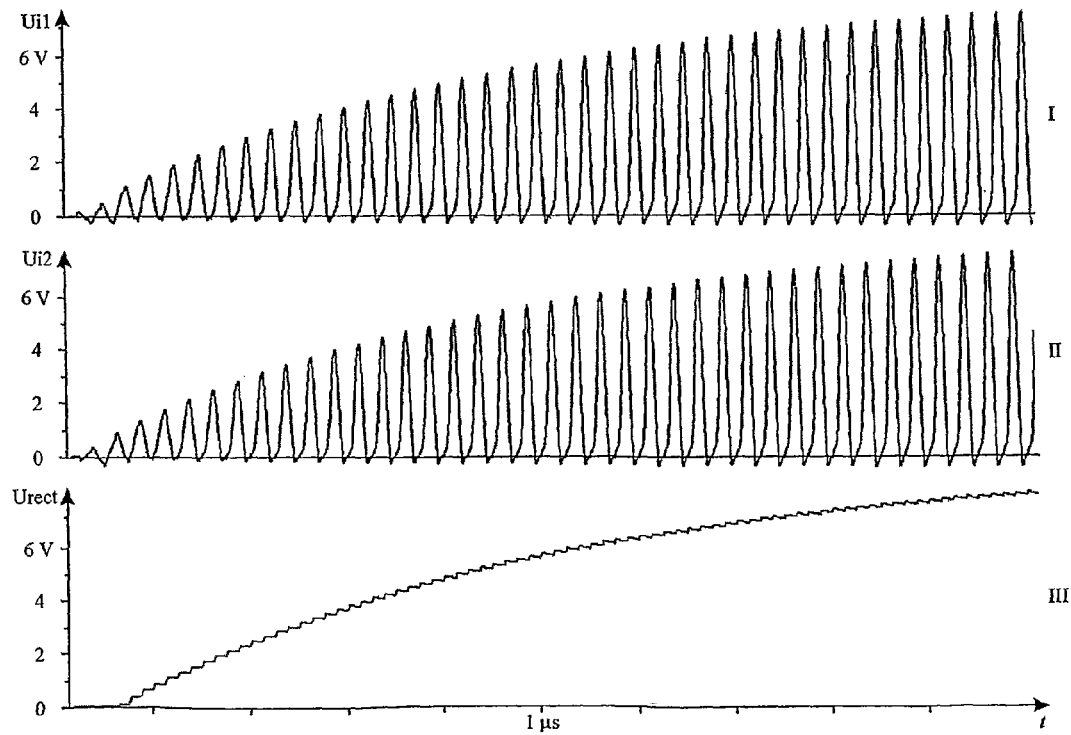

Time development of a dc voltage Urect at the output of the rectifier Rect for the variant embodiment of the transceiver circuit TRC of the invention is represented in window III in FIG. 4 after the receiving circuit RC starts receiving said differential signals (FIG. 4 windows I and II).

The method and circuit as proposed by the invention are intended for transmitting low power radio waves of several ten milliwatts and for receiving them. Such transmitting power is sufficient for many applications.

The invention claimed is:

1. A method for transmitting and receiving radio waves with a single oscillatory circuit antenna (OCA),
by conducting a transmitted signal from the output of a transmitting circuit (TC) included in an integrated transceiver circuit (TRC) through matching capacitors (MC1, MC2) to connecting terminals of the oscillatory circuit antenna (OCA), characterized in
that the signal received by the oscillatory circuit antenna (OCA) is conducted from the antenna terminals directly to the input of a receiving circuit (RC) included in the integrated transceiver circuit (TRC)
and that a potential value of said received signal at the input of the receiving circuit (RC) is maintained within an interval, which extends between
the lower potential value being approximately equal to an earth potential of the integrated transceiver circuit (TRC) and
the upper potential value exceeding said lower potential value by the highest possible voltage still allowable by the integrated transceiver circuit (TRC).

2. The method as recited in claim 1, characterized in
that said lower potential value of the received signal at the input of the receiving circuit (RC) is maintained at the earth potential of the integrated transceiver circuit (TRC)
and that the received signal from the input of the receiving circuit (RC) is rectified, too, and
the electric direct current generated hereby is used for additional energization in the receiving circuit (RC).

3. A circuit for transmitting and receiving radio waves with a single oscillatory circuit antenna (OCA),
in which circuit output terminals (o1, o2) of a differentially excited transmitting circuit (TC) included in an integrated transceiver circuit (TRC) are connected through matching capacitors (MC1, MC2) to connecting terminals of said oscillatory circuit antenna (OCA),
characterized in
that the connecting terminals of the oscillatory circuit antenna (OCA) are directly connected to input terminals (i1, i2) of the receiving circuit (RC) included in the integrated transceiver circuit (TRC)
and that each of the input terminals (i1, i2) of the receiving circuit (RC) is connected to an earthing terminal (m) of the integrated transceiver circuit (TRC) through
a corresponding undervoltage-protection diode (UPD1, UPD2)
determining a lower potential value of the received signal and
a corresponding overvoltage-protection diode (OPD1, OPD2)
determining an allowed upper potential value of the received signal
exceeding said lower potential value by the highest possible voltage
still allowable by the integrated transceiver circuit (TRC),
said undervoltage-protection diodes (UPD1, UPD2) and overvoltage-protection diodes (OPD1, OPD2) being integrated in the transceiver circuit (TRC).

4. The circuit as recited in claim 3, characterized in
that the input terminals (i1, i2) of the receiving circuit (RC) are connected to the earthing terminal (m) of the integrated transceiver circuit (TRC) also through a DC restorer (DCR) that is integrated in the transceiver circuit (TRC),
and that the input terminals (i1, i2) of the receiving circuit (RC) are connected to input terminals of a rectifier (Rect) integrated in the transceiver circuit (TRC), and an output voltage (Urect) of said rectifier (Rect) is used for additional energization in the receiving circuit (RC).

5. The circuit as recited in claim 4, characterized in
that a midpoint of a coil (ACo) of said oscillatory circuit antenna (OCA) is earthed and that the connecting terminals of the oscillatory circuit antenna (OCA) are connected to the input terminals (i1, i2) of the receiving circuit (RC) through do decoupling capacitors (DC1, DC2).

6. The circuit as recited in claim 5, characterized in
that the overvoltage-protection diodes (OPD1, OPD2) are overvoltage protective transistors.

7. The circuit according to any of claims 4 to 6, characterized in that the dc restorer (DCR) is embodied by transistors (T1, T2).

8. The circuit according to any of claims 4 to 6, characterized in
that the dc restorer (DCR) is embodied by Schottky diodes, that are connected between the input terminals (i1, i2) of the receiving circuit (RC) and the earthing terminal (m) of the integrated transceiver circuit (TRC).

\* \* \* \* \*